(12) United States Patent
Groaser et al.

(10) Patent No.: US 6,457,827 B1
(45) Date of Patent: *Oct. 1, 2002

(54) FILM GUIDE FOR A MOVIE CAMERA

(75) Inventors: Claus Groaser, Freising; Thomas Popp, München, both of (DE)

(73) Assignee: Arnold & Richter Cine Technik GmbH & Co. Betriebs KG, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,932

(22) Filed: Dec. 22, 1999

(30) Foreign Application Priority Data

Dec. 23, 1998 (DE) .......................... 198 60 712

(51) Int. Cl.⁷ .............................. G03B 1/00; G03B 1/48
(52) U.S. Cl. .................... 352/166; 352/221; 352/224
(58) Field of Search ................... 352/166, 221, 352/224, 225, 226, 227, 229

(56) References Cited

U.S. PATENT DOCUMENTS

| | | | | |
|---|---|---|---|---|
| 1,404,707 A | * | 1/1922 | Brown | 352/227 |
| 3,103,861 A | * | 9/1963 | Koeppe | 396/440 |
| 3,479,114 A | * | 11/1969 | Heinonen | 352/225 |
| 3,833,292 A | | 9/1974 | Blaschek | 352/77 |
| 3,871,760 A | * | 3/1975 | Roth | 353/95 |
| 3,912,381 A | * | 10/1975 | Burke, Jr. | 352/72 |
| 3,954,330 A | * | 5/1976 | Sakaguchi et al. | 352/224 |
| 4,487,491 A | * | 12/1984 | Inaba | 396/442 |
| 4,522,476 A | * | 6/1985 | Renold | 352/225 |
| 4,744,651 A | * | 5/1988 | Beauviala | 352/225 |
| 5,184,158 A | * | 2/1993 | Grosser | 352/226 |

FOREIGN PATENT DOCUMENTS

| | | |
|---|---|---|
| DE | 85 31 946.5 | 2/1986 |
| JP | 61-27527 | 2/1986 |
| JP | 4-362621 | 12/1992 |

OTHER PUBLICATIONS

"SIGRADUR®–Sorten" Internet http://www.htw–germany.com/en/productinfo/index.shtml (with English translation).
Carl Zeiss/Arriflex Lenses, Brochure, 2 pages.

* cited by examiner

Primary Examiner—Russell Adams
Assistant Examiner—Rodney Fuller
(74) Attorney, Agent, or Firm—Christie, Parker & Hale, LLP

(57) ABSTRACT

A film guide for a movie camera 1 with a distance window 5 positioned in the shooting path of rays 3 of the movie camera 1, whereby this distance window 5 has a picture gate 52 and a platen 7a, between which the movie film 6 is moved. At least the upper surface of the platen 7a facing the movie film 6 is formed in a ray-absorbing or non-reflecting way.

8 Claims, 4 Drawing Sheets

FILM GUIDE FOR A MOVIE CAMERA

CROSS-REFERENCE OF RELATED APPLICATIONS

This application claims priority of German Application No. 198 60 712.1 filed Dec. 23, 1998, a copy of which is Attachment A hereto, the disclosure of which is incorporated fully herein by reference.

BACKGROUND OF THE INVENTION

The invention relates to a film guide for a movie camera.

Film guides for movie films in movie cameras have a distance window positioned in the optical path of rays of the shooting lens of the movie camera, whereby this distance window consists of a picture gate, which determines the size of the area of the individual pictures of the movie film to be exposed, side walls running in the longitudinal direction of the movie film and bordering on the side edges of the movie film, and a platen lying opposite the picture gate, whereby the movie film is moved between these components. Picture gate, platen and side walls thus form a film guiding channel, which fixes the movie film in a picture plane in such a way as to ensure a constant support dimension, i.e. a constant-remaining focusing plane for the movie film during film transport. In the side stems there are grooves or bores for receiving the gripper points as well as possibly a locking gripper of a film transport mechanism for film transport and for ensuring a picture standing position.

Movie films generally consist of an underlay made of triacetate or polyester with high breaking strength and dimensional stability both with normal picture speeds and very high picture speeds, a light-sensitive emulsion applied to one side of the underlay (the front side of the movie film), whereby this emulsion is covered externally by a protecting layer, and a back layer or sliding layer applied to the other side of the underlay, whereby this layer is generally formed in an anti-static way for the purpose of avoiding static flashes on the movie film.

Fundamentally, due to reflections of the shooting rays which arise on the platen, which lies on the back layer of the movie film, undesired changes are brought about in the picture content of the individual pictures of the movie film, which in certain shooting conditions make film-shooting inefficient. This effect occurs in particular with films without an anti-halo layer as well as with black and white films and infra-red films. It is intensified in that in many applications the platen has so-called sliding stems for the purpose of reducing the friction on the movie film, whereby these sliding stems can extend in the movement direction of the movie film or at right angles or diagonally to the movement direction and lie on the back layer of the movie film, in such a way that at these points there is a stronger reflection than on the actual platen, which is reproduced in the picture content as a lattice structure.

SUMMARY OF THE INVENTION

It is an object of the present invention to create a film guide with a distance window of the type mentioned above, which ensures exact guiding of the movie film in the picture or focusing plane with minimal friction between the movie film and the film guide and which excludes or minimises changes in the picture content due to ray reflections on the platen.

The solution according to the invention ensures the maintaining of minimal friction of the movie film in the film guide of the distance window, while ensuring exact guiding of the movie film in the region of the picture plane or focusing plane, and while avoiding reflections of the shooting path of rays on the platen as well as distortions of the picture content of the individual pictures of the movie film which are thereby brought about.

If is advantageous if the distance window has platen with black or black-coloured material and sliding stems made from glass carbon (in particular from Sigradur K. glass carbon) which are positioned on it and run parallel to one another in the film transport direction.

For the purpose of easy and cost-effective manufacturing as well as long durability, the sliding stems are preferably stuck on the platen. Through the positioning of the sliding stems in hollows of the platen which run in the longitudinal direction of the film transport, the durability and precise alignment of the sliding stems is further increased. A secure connection between the sliding stems and the platen is thereby ensured even with materials with different heat expansion coefficients, and all in all simple and cost-effective manufacture is also ensured.

Through bevelling the sliding stems at their ends, it is ensured that the movie film is not damaged before it enters the region of the distance window or after leaving the distance window. In addition, it is ensured that no reflections can arise on sharp edges.

Preferably the platen can be inserted in a locking way into the distance window, in such a way that platens of differing kinds can be used for differing film types and/or for differing shooting conditions.

It is particularly advantageous if the distance window is formed as a component of a drive module of the movie camera and can be easily tilted and removed from the drive module as well as being connected to it.

By reference to an embodiment shown in the drawings, the though behind the invention will now be explained in greater detail. The drawings show:

DETAILED DESCRIPTION OF THE INVENTION

Figure 1:
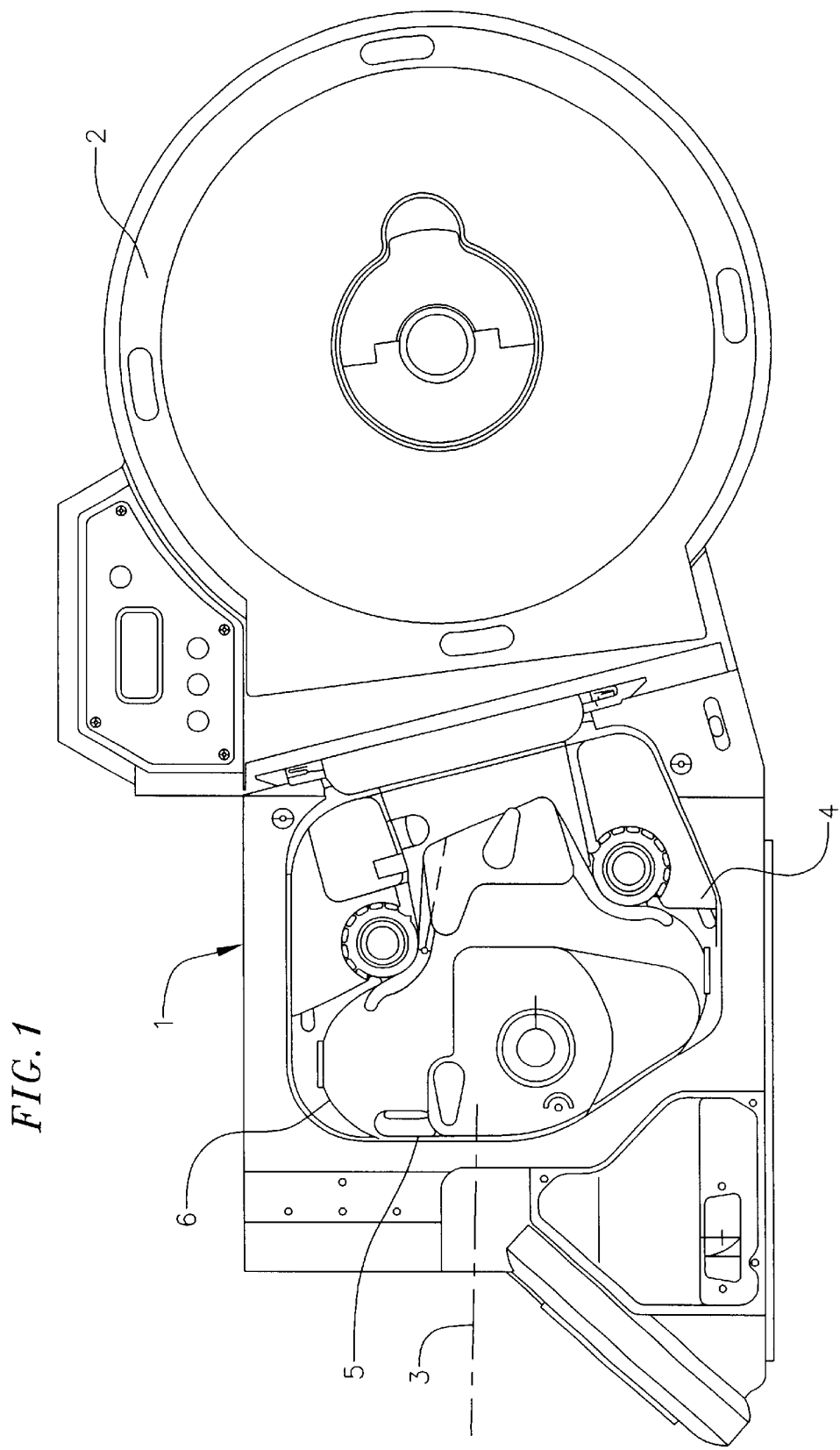
FIG. 1 a side view of a camera case of a movie camera with an opened camera door and a film cassette placed on the camera case.

FIG. 1 shows a side view of a movie camera with a camera case 1 with a film cassette 2, whereby the film transport mechanism 4 thereof which is formed as a drive module is visible when the camera door is opened. The film transport mechanism has a film transport motor, which is connected to a gripper mechanism, which transports the movie film 6 intermittently in a film guide, which in the region of the drive module is formed as a distance window 5, where the individual film pictures are positioned for the purpose of exposure in front of a picture gate positioned in the shooting path of rays 3.

Figure 2:
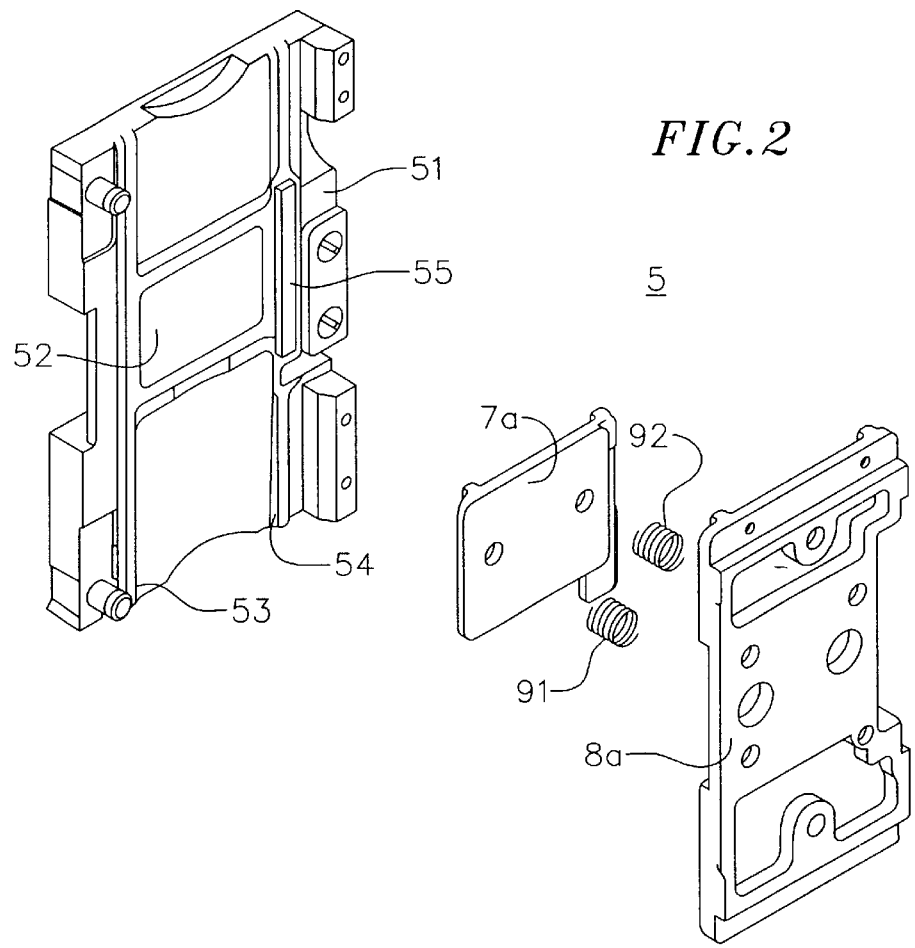
FIG. 2 a perspective blown-up representation of a distance window with a film guide and completely flat platen.

According to FIG. 2, the distance window 5 contains—besides the picture gate 52 determining the area of the individual film pictures of the movie film to be exposed—a platen 7a facing the back side of the movie film, a thrust pad 8a pressing the platen 7a on to the movie film and side film guiding walls 53, 54 with grooves and recesses 55 for receiving the gripper points of the transport and locking grippers connected to the film transport motor.

The distance window 5 ensures that the movie film 6 is moved in a fixed focusing plane behind the picture gate 52 in such a way as to ensure a constant support dimension between the picture plane and the securing of the camera lens. This is brought into effect through the platen 7a and the thrust pad 8a, which are connected to each other through pressure springs 91, 92 in such a way that the platen 7a is pressed onto the back layer of the movie film with a constant-remaining pressure. The thrust pad 8a itself is connected to a swivel mechanism in a way which is not described in further detail, whereby this swivel mechanism is formed as part of the film transport module.

In FIG. 2, the platen 7a is formed as a completely flat plate, which according to the invention consists of black, non-reflecting or light-absorbing material and/or a corresponding layer or colouring.

Figure 3:
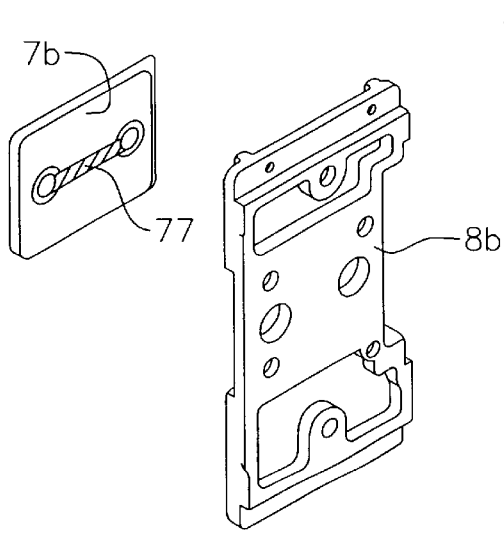
FIG. 3 a perspective blown-up representation with a platen with a sliding stem positioned at right angles to the film guiding direction.

FIG. 3 shows a platen 7b with a sliding stem 77 made from Sigradur K. glass carbon and running at right angles to the film guiding direction, and which by means of a thrust pad 8b suited to the configuration of the sliding stem 77 lies on the back layer of a movie film.

Figure 4:
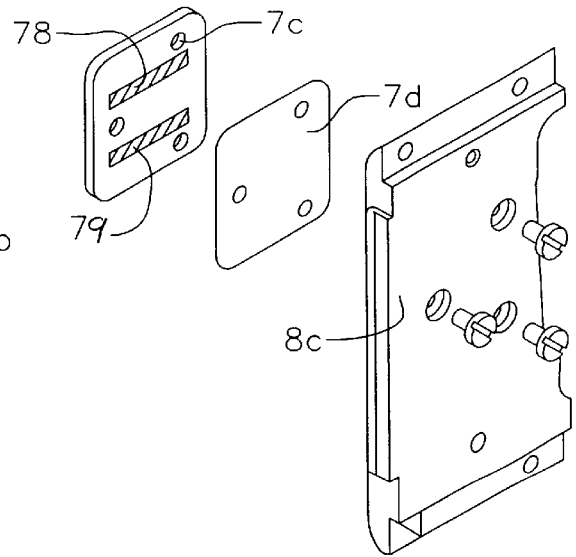
FIG. 4 a perspective blown-up representation with a platen with two sliding stems positioned at right angles to the film guiding direction.
Figure 5:
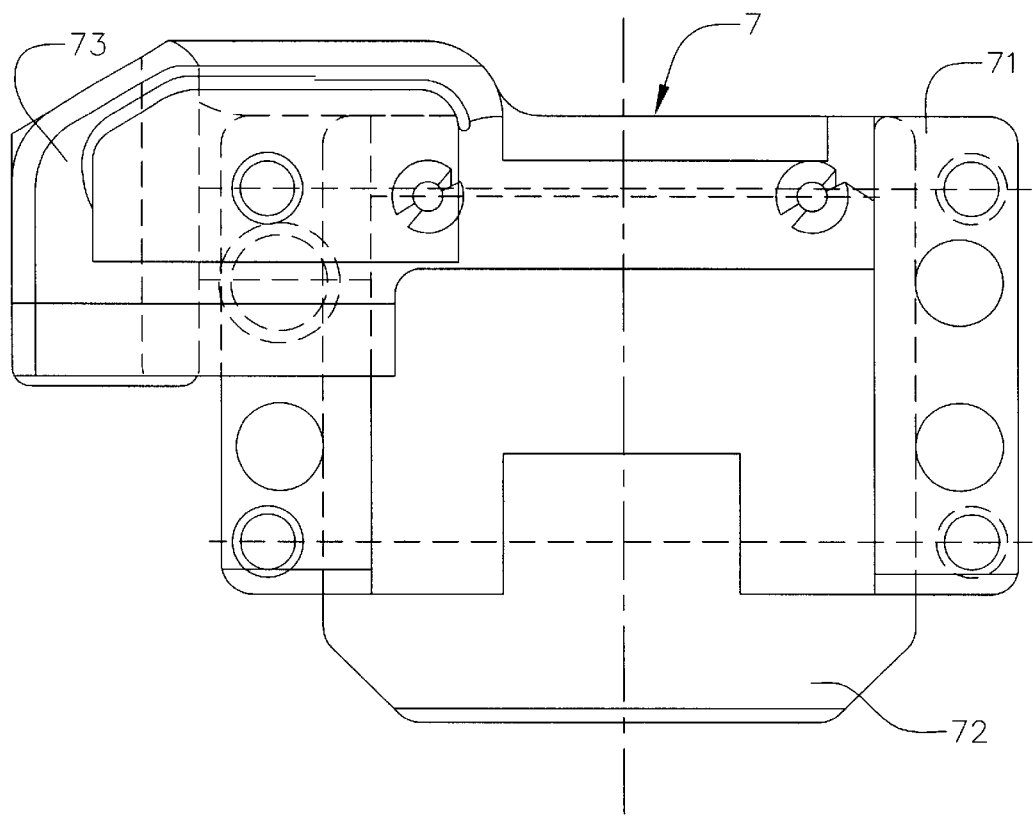
FIG. 5 a rear-side view of a platen.
Figure 6:
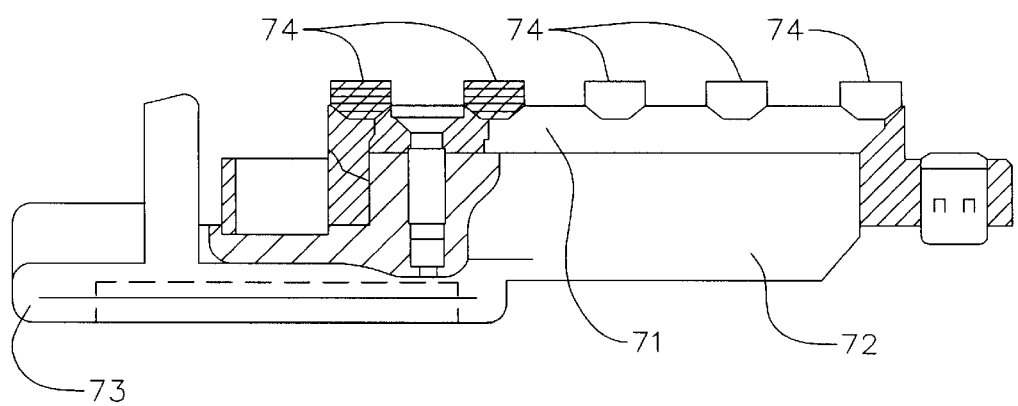
FIG. 6 a partially cut top view of the platen according to FIG. 5 with five guiding stems positioned in the film guiding direction.
Figure 7:
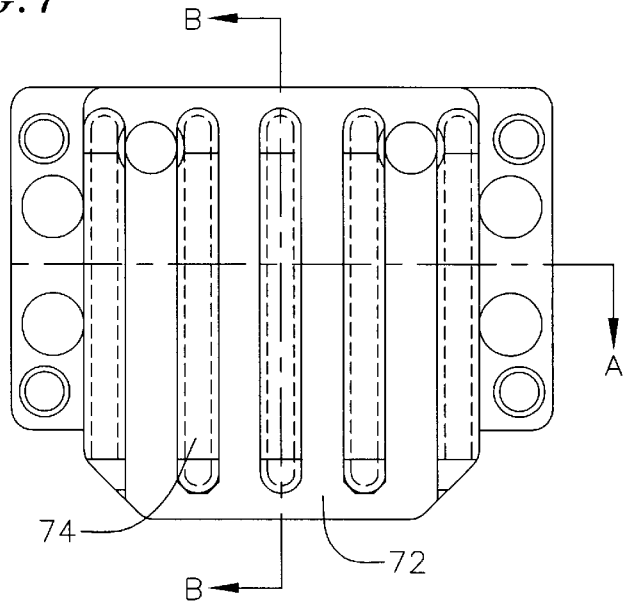
FIG. 7 a front side view of the platen according to FIGS. 5 and 6.

FIG. 4 shows a platen 7c with two sliding stems 78, 79 made from Sigradur K. glass carbon, which run parallel to one another and at right angles to the film guiding direction, and which are connected through an intermediate plate 7d and three bores and corresponding connecting screws to a thrust pad 8c and are pressed on to the back layer of a movie film.

The platen 10 shown in FIGS. 2 to 7 in different views, sections and individual component representations consists of a thrust pad 71, a mounting support 72, a grip 73 and several—five in the present embodiment—sliding stems 74 facing the back side of the movie film, which are long and are positioned parallel to one another and which run in the transport or film guiding direction of the movie film 9. According to FIG. 6, these sliding stems 74 are put into hollows 76 of the mounting support 72 and are stuck to the mounting support 72, preferably with a dual component sticker.

The sliding stems 74 are made from Sigradur K. glass carbon, whereby the flattened upper surfaces 75 of the sliding stems 74 lying on the back side of the film are grinded and/or polished, in order to achieve a further reduction in the friction of the movie film 6 sliding along on the guiding stems 74.

The platen 7 which consists of a ray-absorbing or non-reflecting material and/or the upper surface 70 of the platen 7 receiving the sliding stems 74, is covered with a dark, preferably black, material, for example sprayed with a corresponding colour. It is also within the scope of the present invention for the entire distance window 5, i.e. the picture gate, the side stems and the platen 7, to consist of a ray-absorbing or non-reflecting material.

The ray-absorbing upper surface 70 of the platen 7 in association with the sliding stems 74 consisting of Sigradur K. glass carbon prevents a reflection of the shooting rays on the distance window 5 and thus a corresponding distortion of the picture content of the individual pictures of the movie film 6.

Figure 10:
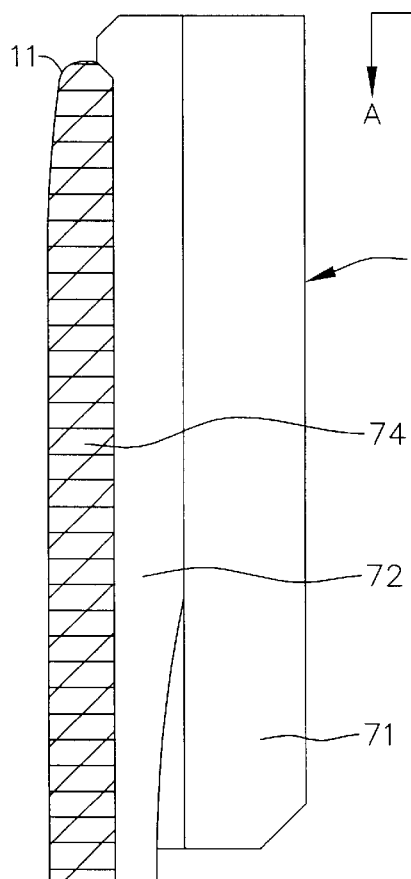
FIG. 10 a section through the platen according to FIG. 7 along the line B—B.
Figure 8:
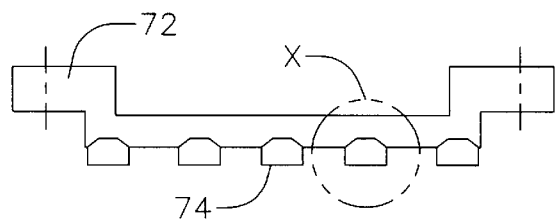
FIG. 8 a section through the platen according to FIG. 7 along the line A—A.
Figure 9:
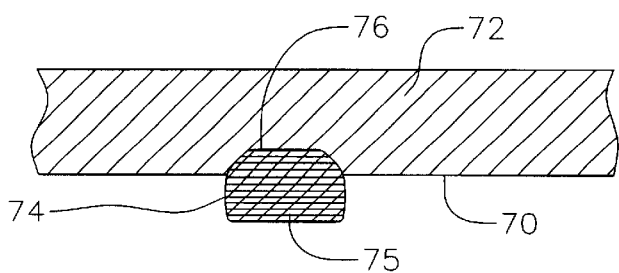
FIG. 9 an enlarged representation of the area X of a sliding stem receiving point of the platen according to FIG. 8.

In the region of entry and exit of the movie film 6 in the distance window 5, according to FIG. 10 the sliding stems 74 are provided with bevels 11, 12, and additional radiuses on the ends of the sliding stems 74 ensure a low-friction guiding of the movie film 6 and a careful guiding of the movie film 6. In addition, reflections on the edges of the sliding stems 74 are avoided.

As can be seen in particular from the section through the distance window 5 according to FIG. 10, the mounting support 72 is partially cut behind, in such a way that there is an elastic area of the mounting support 72 on the thrust pad 71.

As an alternative to the above-described sliding stems positioned in the film guiding direction or at right angles to the film guiding direction on a platen, these sliding stems can also be secured on the platen in an inclining way, in particular running diagonally to the film guiding direction, or they can be manufactured in a one-component way from the platen in such a way that they are an integral component of the platen. Combinations of sliding stems running at right angles and diagonally or longitudinally to the film guiding direction are also within the scope of the present invention.

Furthermore, positioned of the sliding stems themselves in a sprung way in the platen is possible, and connection thereof directly to the thrust pad or to a formation as part of the thrust pad.

What is claimed is:

1. A film guide for a movie camera comprising:
   a distance window positioned in a shooting path of rays of the movie camera, the distance window having a film gate and a black platen, between which a movie film is moved;
   wherein the platen includes an upper surface facing the movie film and being at least one of ray-absorbing and nonreflecting;
   wherein the platen includes a plurality of sliding stems made from glass carbon, and wherein the sliding stems are affixed to the platen.

2. The film guide according to claim 1 wherein the sliding stems are positioned in an at least one elongated hollow of the platen running in the film transport direction.

3. The film guide according to claim 1 wherein the sliding stems are beveled at their ends.

4. The film guide according to claim 1 wherein the sliding stems are ground.

5. The film guide according to claim 1 wherein the sliding stems are polished.

6. The film guide according to claim 1 wherein the platen is formed elastically in a plane perpendicular to a movie film plane.

7. The film guide according to claim 1 wherein the platen is locked into the distance window.

8. The film guide according to claim 1 wherein the distance window is connected to a drive module of the movie camera in a jointed and separable way.

* * * * *